(12) United States Patent
Lee

(10) Patent No.: US 11,682,301 B2
(45) Date of Patent: Jun. 20, 2023

(54) AUTOMATIC CONTROL SYSTEM OF SMART BUS PLATFORM CONSIDERING THE NUMBER OF USERS AND STAYING TIME

(71) Applicant: EP KOREA CO., LTD., Seoul (KR)

(72) Inventor: Hae Yong Lee, Seoul (KR)

(73) Assignee: E.P. Korea Co., Ltd., Seoul (KR)

( * ) Notice: Subject to any disclaimer, the term of this patent is extended or adjusted under 35 U.S.C. 154(b) by 0 days.

(21) Appl. No.: 17/890,204

(22) Filed: Aug. 17, 2022

(65) Prior Publication Data
US 2022/0406185 A1    Dec. 22, 2022

(30) Foreign Application Priority Data

Jun. 18, 2021  (KR) .................. 10-2021-0079290

(51) Int. Cl.
*G08G 1/123* (2006.01)
*E04H 1/12* (2006.01)
*G06T 7/70* (2017.01)

(52) U.S. Cl.
CPC ........... *G08G 1/123* (2013.01); *E04H 1/1211* (2013.01); *G06T 7/70* (2017.01); *G06T 2207/10048* (2013.01); *G06T 2207/30196* (2013.01); *G06T 2207/30242* (2013.01)

(58) Field of Classification Search
CPC ......... G08G 1/123; E04H 1/1211; G06T 7/70; G06T 2207/10048; G06T 2207/30196; G06T 2207/30242
See application file for complete search history.

(56) References Cited

U.S. PATENT DOCUMENTS

| 8,272,175 | B1 * | 9/2012 | Williams-Prades | ....... E04H 1/14 135/900 |
|---|---|---|---|---|
| 10,030,881 | B2 | 7/2018 | Lim et al. | |
| 2012/0004840 | A1 | 1/2012 | Lee et al. | |
| 2022/0147946 | A1 * | 5/2022 | Semertzidis | ....... G06Q 10/1093 |

FOREIGN PATENT DOCUMENTS

| KR | 20120002102 A | 1/2012 |
|---|---|---|
| KR | 20150100289 A | 9/2015 |
| KR | 20160023735 A | 3/2016 |
| KR | 20160082562 A | 7/2016 |
| KR | 102008441 B1 | 8/2019 |
| KR | 102048357 B1 | 1/2020 |
| KR | 102219364 B1 | 2/2021 |
| KR | 20210041648 A | 4/2021 |

* cited by examiner

Primary Examiner — Mohamed Barakat
Assistant Examiner — Sharmin Akhter
(74) Attorney, Agent, or Firm — Heidi Eisenhut; Loza & Loza, LLP

(57) ABSTRACT

The automatic control system of the smart bus platform includes a plurality of electronic devices provided in the shelter and a control unit. The control unit controls at least one of the plurality of electronic devices based on at least one of the number of users and a prospective staying time of the users in the shelter.

11 Claims, 14 Drawing Sheets

FIG. 21

S2110 — Displaying a list of buses scheduled to enter the smart bus platform on the first display unit S2120 — Displaying a vehicle number information and a number information of the prospective boarding passengers

FIG. 22

| a vehicle number information | a number of the prospective boarding passengers |
|---|---|
| Seoul OOGa OOOO | three people |
| Seoul OOSa OOOO | five people |
| Seoul OOCha OOOO | seven people |
| ⋮ | ⋮ |

AUTOMATIC CONTROL SYSTEM OF SMART BUS PLATFORM CONSIDERING THE NUMBER OF USERS AND STAYING TIME

CROSS-REFERENCE TO RELATED APPLICATION

This application claims under 35 U.S.C. § 119 to Korean Patent Application No. 10-2021-0079290 filed Jun. 18, 2021, which is hereby incorporated by reference in its entirety

TECHNICAL FIELD

The embodiment relates to a smart bus platform. Specifically, the embodiment relates to an automatic control system of smart bus platform in consideration of the number of users and the staying time.

BACKGROUND ART

Buses are widely used public transport in modern society, allowing users to move quickly between cities and regions within cities. Users arrive at the bus stop before the bus they want to board, and wait for the bus to arrive. These waiting times range from a few seconds to tens of minutes.

Therefore, benches are usually provided at the bus platform so that users can sit and rest while waiting for the bus. However, these benches are exposed to the outside, so it is difficult to sit on the bench when it rains or the sun is hot.

Accordingly, a simple shelter having a ceiling or a side wall is provided at the bus stop, and a bench is provided in the shelter, thereby protecting users in the simple shelter from rain or sunlight.

However, these simple shelters have an open front. Therefore, it is still not possible to protect the users in the shelter from the strong cold in winter, strong sunlight at sunset, or strong rain that falls diagonally.

Recently, a heater or an air conditioner is provided in a simple shelter to enhance the convenience of users. However, since a front of the simple shelter is open, it is difficult to obtain as much as expected the warming effect by the heater and the cooling effect by the air conditioner. In addition, there is a problem in that the power consumption of the heater or air conditioner is severe.

In order to solve this problem, recently, it has been developed in a bus platform equipped with a shelter with an entrance and a closed inside. The closed shelter allows users to comfortably wait for the bus regardless of environmental conditions such as cold or heat outside.

However, due to the pleasant indoor environment of such a closed shelter, abnormal users such as homeless people sleep in the shelter during the late night hours when the shelter is not operated, and it is expected that the shelter becomes dirty or smells bad.

In addition, even though there are bus users in the shelter during the bus service time, these abnormal users forcibly enter the shelter to rest, or make a fuss with drinking, and singing, so there is a problem in that the bus users cannot use the shelter and the use efficiency of the shelter is lowered.

Meanwhile, while the abnormal user is staying at the shelter, the control personnel can be dispatched by a citizen's report. However, since the control personnel are not always near the shelter, it takes a considerable time for the control personnel to arrive at the shelter. As a result, the abnormal users will have already escaped from the shelter and the control personnel cannot arrest them. Therefore, control personnel must stay in the shelter. In this case, it is expected that the labor cost increases, which causes difficulties in the operation of the shelter.

In addition, the environmental conditions of the enclosed shelter change according to the number of users in the shelter or the staying time of the users. For example, various electronic devices are operated, but these various electronic devices are only operated according to a fixed set value. On the other hand, as the number of users in the shelter increases or decreases, the temperature, air quality, air pollution, etc. in the shelter may change.

For example, if the number of users in the shelter increases, the temperature in the shelter increases due to heat emitted from each of the users. In addition, if the number of users in the shelter increases, the air quality or air pollution in the shelter deteriorates due to fine dust attached to each user or a smell generated by each user.

However, in the related art, the closed shelter is not properly provided. Also, in particular, it is operated according to a preset value without considering the number of users or the staying time of users in the closed shelter, so there is a problem in that the air comfort in the shelter is impaired.

In addition, although research to prevent non-stop buses has been conducted in the related art, this problem has not been properly solved. Currently, bus drivers use a one-way method to visually check whether bus passengers are present at the platform. However, there is a limitation in that there is no way for passengers boarding the bus to inform the bus driver of the boarding scheduling information.

DISCLOSURE

Technical Problem

Embodiments can solve the above and other problems.

Another object of the embodiment is to provide an automatic control system of a smart bus platform that can prevent abnormal users from easily entering the shelter or can expel abnormal users from the shelter.

Another object of the embodiment is to provide an automatic control system for a smart bus platform that can create a comfortable indoor environment in consideration of the number of users or the length of stay.

Another object of the embodiment is to provide an automatic control system for a smart bus platform in which a bus driver can check boarding information at a corresponding bus platform in advance before entering the bus platform.

The technical problems of the embodiments are not limited to those described in this item, and include those that can be understood through the description of the invention.

Technical Solution

According to one aspect of the embodiment to achieve the above or other object, the automatic control system of the smart bus platform can include a plurality of electronic devices provided in the shelter; and a control unit. The control unit controls at least one device among the plurality of electronic devices based on the number of users and a prospective staying time of the users in the shelter.

Through this, the embodiment can provide an automatic control system for the smart bus platform in consideration of the number of users and the prospective staying time.

Advantageous Effects

The technical effect of the automatic control system of the smart bus platform according to the embodiment will be described as follows.

According to at least one of the embodiments, only normal users can enter the shelter, but abnormal users are not allowed to enter the shelter. So, it is possible to maintain and efficiently manage the comfortable environment of the shelter. Also, it is possible to protect normal users who take a break in the shelter from abnormal users.

According to at least one of the embodiments, it is possible to determine whether the user is normal or abnormal in several steps in advance. Accordingly, the accuracy of determining whether the user is abnormal can be improved, and problems that may occur due to misjudgment can be reduced.

According to at least one of the embodiments, the first space should be passed before entering the second space from the outside. Fine dust, etc. attached to the user in the first space can be removed so that the user can enter the second space in the cleanest state possible. Therefore, it is easy to manage cleanest of the second space, which is a rest space, and there is an advantage that users taking a break in the second space can enjoy a rest in a comfortable state.

According to at least one of the embodiments, it is possible to actively cope with a change in the indoor environment by controlling the plurality of electronic devices based on the number of users or the length of stay. Therefore, there is an advantage in that the popularization of the shelter can be accelerated by increasing the user's possibility of using the shelter. In addition, the indoor environment in the shelter can be always pleasant and optimized.

On the other hand, when the electronic device is frequently adjusted and the indoor environment of the shelter changes from time to time, it may cause discomfort to users in the shelter. Accordingly, it is possible to reduce power consumption and maintain a comfortable indoor environment by preventing a plurality of electronic devices from being adjusted too frequently.

According to at least one of the embodiments, information on the number of people expected to board the scheduled arrival bus from the corresponding smart bus platform can be transmitted to the corresponding bus. So the driver of the corresponding bus should stop to pick up passengers at the corresponding smart bus platform. Therefore, it has the advantage of helping the driver to drive by knowing in advance how many people will be boarding at the smart bus platform. Also, there is a special effect that can prevent nonstop buses.

According to at least one of the embodiments, information on the number of people scheduled to board the corresponding bus at the corresponding smart bus platform can be displayed on the second display unit installed outside the shelter. So, the driver of the bus entering the smart bus platform can know whether there are passengers on the bus stop and how many users will be on it.

Further scope of applicability of embodiments will become apparent from the following detailed description. However, it should be understood that the detailed description and specific embodiments, such as preferred embodiments, are given by way of example only, since various changes and modifications within the spirit and scope of the embodiments may be clearly understood by those skilled in the art.

BRIEF DESCRIPTION OF THE DRAWINGS

FIG. 21 illustrates a sixth management method of a shelter in a smart bus platform according to the second embodiment.

FIG. 22 shows a state displayed on the second display unit.

MODE FOR INVENTION

Figure 1:
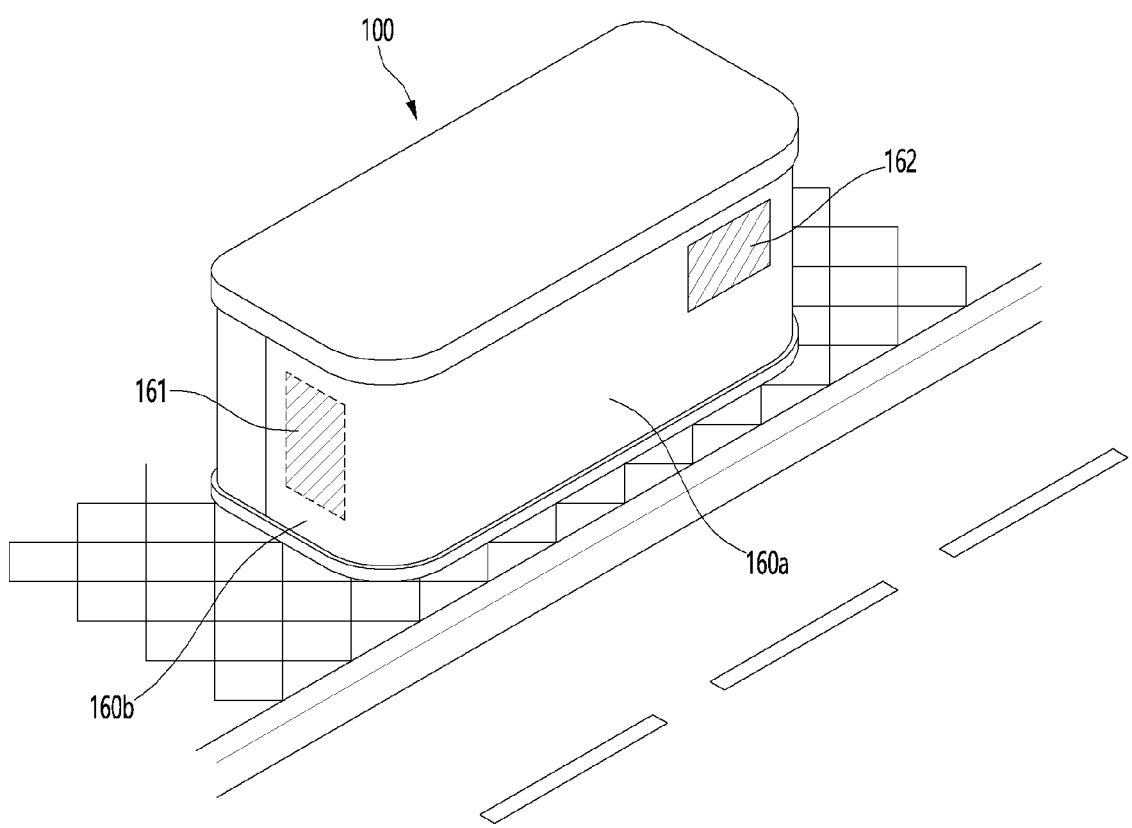
FIG. 1 shows a smart bus platform according to an embodiment.

Hereinafter, the embodiments disclosed in the present specification will be described in detail with reference to the accompanying drawings, but the same or similar components are assigned the same reference numbers regardless of reference numerals, and redundant description thereof will be omitted. The suffixes 'module' and 'part' for the components used in the following description are given or mixed in consideration of ease of writing the specification, and do not have distinct meanings or roles by themselves. In addition, the accompanying drawings are provided for easy understanding of the embodiments disclosed in the present specification, and the technical ideas disclosed in the present specification are not limited by the accompanying drawings.

Also, when an element, such as a layer, region, or substrate, is referred to as being 'on' another component, this includes that it is directly on the other element or there may be other intermediate elements there between.

FIG. 1 shows a smart bus platform according to an embodiment.

Referring to FIG. 1, the smart bus platform according to the embodiment may include a shelter 100.

Here, smart may mean that the function of the shelter 100 is remarkably improved compared to before. For example, the shelter 100 of the embodiment is provided with various types of electronic devices, and a comfortable indoor environment can be created by the operation of the respective types of electronic devices. For example, the shelter 100 of the embodiment is capable of external communication so that real-time or two-way communication or data transmission and reception is possible with the shelter 100 or, for example, a central control center. The central control center may comprehensively or systematically manage the shelter 100 installed at each smart bus platform. Although not shown, an artificial intelligence engine is installed in the central control center and various sensors may be installed in each shelter 100. In this case, various detection signals obtained from various sensors of each shelter 100 are transmitted to the central control center, and the artificial intelligence engine of the central control center receives these various detection signals as an input to accurately determine the situation of each shelter 100. As a result of the execution of the artificial intelligence engine, the possibility of fire of each shelter 100, the possibility of electric leakage, the possibility of failure of various electronic devices, the replacement time of lighting, etc. can be precisely monitored.

All functions of the control unit (See 120 in FIG. 3) of the embodiment described below may be replaced by the artificial intelligence engine of the central control center, but the present invention is not limited thereto.

On the other hand, the shelter 100 may be partially installed with glass windows (160a, 160b). For example, the windshield can include a front windshield 160a and a side windshield 160b. The front windshield 160a and the side windshield 160b may be integrally formed. The glass windows 160a and 160b are formed of a material having excellent physical support strength, and thus may not be broken by a physical impact. The glass windows 160a and 160b are made of a material having excellent transparency, so that the inside can be easily seen from the inside or the outside. Due to the glass windows 160a and 160b, the user in the shelter 100 can easily check whether the bus to be boarded arrives. The area where the front glass window 160a and the side glass window 160b of the shelter 100 meet may have a round shape, but is not limited thereto.

Although not shown, various convenience facilities may be provided in the shelter 100. For example, various types of benches or chairs may be provided in the shelter 100. For example, various types of desks may be provided in the shelter 100. For example, a charger capable of charging various wireless devices such as smartphones and laptops may be installed in various places within the shelter 100. For example, a shelf on which various books are provided may be provided in the shelter 100. For example, a coffee machine for purchasing coffee may be provided in the shelter 100. For example, a customized chair for the elderly or the disabled may be provided in the shelter 100.

Meanwhile, the shelter 100 may include a first display unit 161 and a second display unit 162. At least one display unit among the first display unit 161 and the second display unit 162 may have a flexible characteristic or a stretchable characteristic.

The first display unit 161 may, for example, be installed on the inner surface of the side glass window 160b, but is not limited thereto. For example, the first display unit 161 may display an advertisement image that can be promoted to a user in the shelter 100.

For example, the first display unit 161 may display a guide image that can be evacuated in an emergency to the user in the shelter 100. For example, the first display unit 161 may display a bus list for a bus currently scheduled to enter the corresponding smart bus platform for the convenience of the user in the shelter 100. That is, the type of bus (village bus, general bus, wide area bus, express bus, etc.), vehicle number information of the bus, the number of vacant seats of the corresponding bus, estimated arrival time information, arrival time information, etc. may be displayed. For example, the bus-related information scheduled to arrive first may be displayed on the top of the first display unit 161, and the bus-related information may be displayed below the first display unit 161 as the arrival order is delayed. For example, when the corresponding bus arrives at the corresponding smart bus platform, the corresponding bus-related information may be removed or disappear from the first display unit 161.

The second display unit 162 may be installed, for example, on an outer surface of one area of the front windshield 160a. For example, the second display unit 162 may be installed on the upper right side of the front windshield 160a so that the user in the shelter 100 does not interfere with seeing the front, but the present invention is not limited thereto.

For example, the second display unit 162 may display an advertisement image that a user outside the shelter 100 can promote to a user passing around the shelter 100. For example, the second display unit 162 may display information that a user outside the shelter 100 at the local government stage including the corresponding smart bus platform or the central government wants to transmit to a user passing around the shelter 100. For example, information on policies currently implemented by local governments or the central government or policies to be promoted in the future may be displayed.

In particular, as will be described later, the second display unit 162 may display information on the number of prospect passenger scheduled to board the corresponding bus together with bus list information. As such, information on the number of prospect passengers scheduled to board is displayed through the second display unit 162, so that the driver of the bus arriving at the corresponding bus platform can see if there is a user who will board his or her bus at the corresponding smart bus platform. It is easy to determine how many prospect passengers there are.

The shelter of the embodiment will be described in detail with reference to FIGS. 2 and 3.

Figure 2:
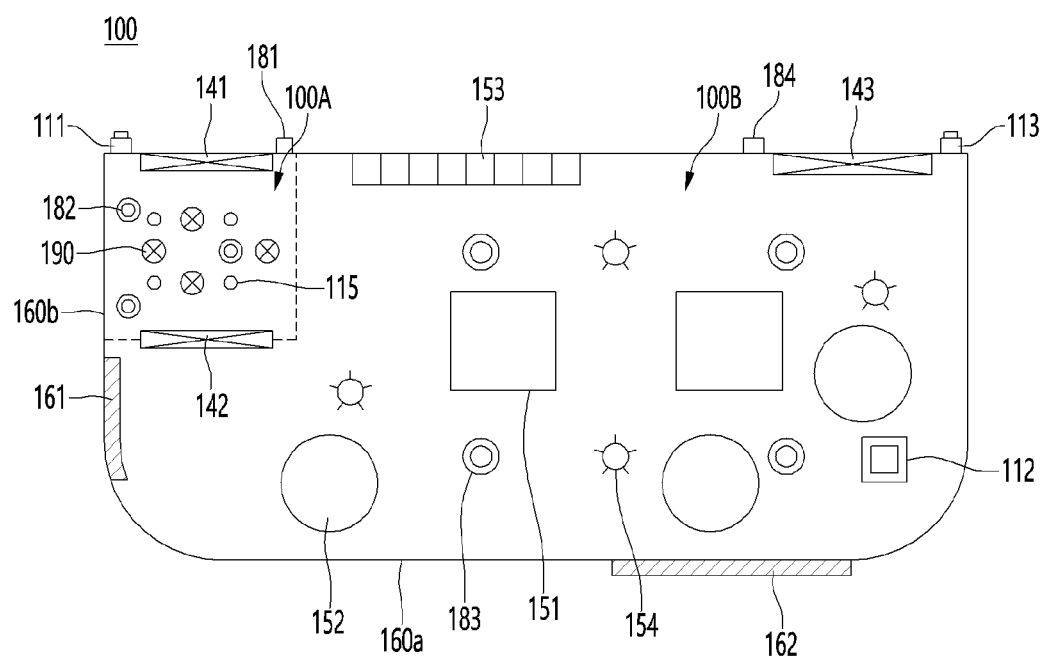
FIG. 2 is a plan view showing a shelter of a smart bus platform according to an embodiment.

FIG. 2 is a plan view showing a shelter of a smart bus platform according to an embodiment. FIG. 3 is a block diagram illustrating a system of a smart bus platform according to an embodiment.

Figure 3:
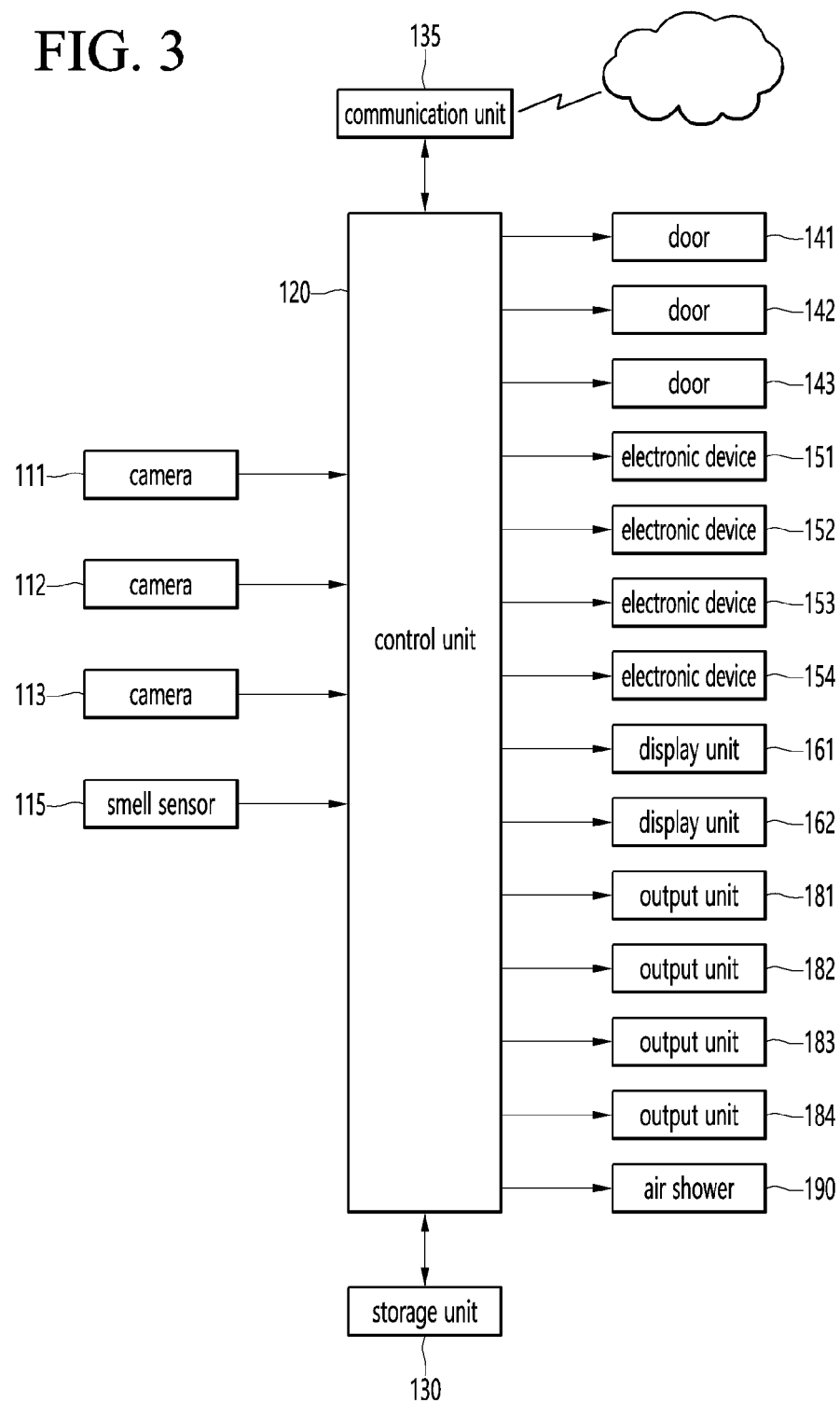
FIG. 3 is a block diagram illustrating a system of a smart bus platform according to an embodiment.

Referring to FIGS. 2 and 3, the shelter 100 of the smart bus platform according to the embodiment can include a first space 100A and a second space 100B. The first space 100A and the second space 100B are physical spaces separated by the shelter 100, and each of the first space 100A and the second space 100B can be sealed.

For example, the first space 100A may be a transit space for an external user to go to the second space 100B, and the second space 100B can be a resting space for the user. Since the first space 100A is only a transit space, it may have a relatively smaller area than the second space 100B for rest, but is not limited thereto. When the shelter 100 can have large size, the first space 100A can have a winding passage shape.

The shelter 100 of the smart bus platform according to the embodiment can include a first door 141, a second door 142, and a third door 143.

For example, the first entrance door 141 may be installed outside the first space 100A. A user outside the shelter 100 may enter the first space 100A through the first entrance door 141.

For example, the second entrance door 142 may be installed between the first space 100A and the second space 100B. For example, a wall is installed between the first space 100A and the second space 100B except for the second door 142, so that the first space 100A and the second space 100B can be physically separated. For example, when the first door 141 and the second door 142 are closed, the first space 100A may be sealed. For example, a user of the first space 100A may enter the second space 100B through the second entrance door 142.

For example, the third door 143 may be installed outside the second space 100B. The user of the second space 100B may go out of the shelter 100 through the second entrance door 142.

For example, the first door 141 and the third door 143 may be installed in the rear of the shelter 100, but is not limited thereto. For example, the first door 141 may be installed on the left side of the shelter 100, and the third door 143 may be installed on the right side of the shelter 100.

Each of the first door 141, the second door 142, and the third door 143 may be a sliding door, but is not limited thereto. Each of the first door 141, the second door 142, and the third door 143 may be an automatic door that is automatically opened and closed according to whether a user is identified. To this end, at least one user detection sensor (not shown) capable of detecting a user may be installed around the first door 141, the second door 142, and the third door 143.

For example, a user who wants to rest in the shelter 100 can enter the second space 100B via the first entrance door 141, the first space 100A, and the second entrance door 142. In addition, the user can take a break in the second space 100B until the bus to board arrives. For example, when a bus scheduled to board arrives at the corresponding smart bus platform to board, the user may go out of the shelter 100 through the third door 143.

On the other hand, the shelter 100, as shown in FIGS. 2 and 3, a plurality of cameras 111 to 113, a smell sensor 115, a plurality of electronic devices 151 to 154, a plurality of display units 161, 162, a plurality of output units 181 to 184 and an air shower 190 may be included.

These electronic devices may be connected to the control unit 120 and controlled under the control of the control unit 120. For example, the control unit 120 may acquire various input data from the plurality of cameras 111 to 113 or the smell sensor 115. And it is possible to control the units 161 and 162, the plurality of output units 181 to 184, and the air shower 190 based on the obtained data, a plurality of electronic devices 151 to 154, and a plurality of displays.

As shown in FIG. 2, the plurality of cameras can include at least one first camera 111 installed near the first door 141, at least one second camera 112 installed in the second space 100B, and at least one third camera 113 installed near the second door 142.

For example, the one or more first cameras 111 may be focused in different directions to acquire images of subjects in different directions. For example, first user information may be obtained from an image obtained by at least one of the at least one or more first cameras 111. The first user information may be acquired by the first camera 111, or a corresponding image may be provided to the control unit 120 to be acquired by the control unit 120.

For example, the one or more second cameras 112 may be focused in different directions to acquire images of subjects in different directions. For example, the second user information may be obtained from an image obtained by at least one of the at least one or more second cameras 112. The second user information may be obtained by the second camera 112, or a corresponding image may be provided to the control unit 120 to be obtained by the control unit 120.

For example, the one or more third cameras 113 may be focused in different directions to acquire images of subjects in different directions. For example, third user information may be obtained from an image obtained by at least one of the at least one or more third cameras 113. The third user information may be obtained by the third camera 113 or a corresponding image may be provided to the control unit 120 to be obtained by the control unit 120.

For example, the first camera 111 may acquire first user information about a user approaching the first door 141. For example, the first user information is external information of the user, and may be, for example, information about the user's hair condition, clothes condition, face condition, and arm or leg condition. For example, when the user's hair is in a state where the user's hair is in a jagged state, the sanitary state of the user may be unclean. For example, if the user's clothes are dusty or dirty, or the clothes are decorated, the sanitary condition of the user may be unclean.

For example, when a user has a severe cut on his or her face or a ugly tattoo on an arm or leg, the user may give fear to those around him. As will be described later, the first user information obtained by the first camera 111 may be used to determine whether the corresponding user is an abnormal user. Here, the abnormal user refers to a user who should not enter the shelter 100, and may be, for example, a person with a strong odor, a homeless person, a person who can scare others, a person intoxicated, a person using drugs, and the like.

When these abnormal users enter the shelter 100, other normal users may not be able to use the shelter 100, and thus the meaning of installation of the shelter 100 may be faded.

For example, the second camera 112 may acquire a second user information about the user who has entered the second space 100B. As will be described later, the second user information obtained by the second camera 112 may be used to determine whether the corresponding user is an abnormal user. The second user information may be behavioral aspect information of the user. A user entering the second space 100B that can be a rest space, may take a rest in various forms.

Usually, a normal user sits quietly in a chair and looks at a smartphone or looks the surroundings. On the other hand, an abnormal user, for example, a homeless person, leans, sits, or lies anywhere in the second space 100B. For example, a drinker drinks with a bottle, shouts, or argues with people around him or her for no reason. Accordingly, it may be determined whether the corresponding user is an abnormal user based on the second user information obtained by the second camera 112.

The second camera 112 may be any camera capable of acquiring the behavioral aspect information of the user, and may include, for example, a thermal imaging camera, an infrared camera, a video camera, a CCTV, and the like.

For example, when the second camera 112 is a thermal imaging camera, since the user can be identified by the thermal imaging camera, the number of users in the second space 100B can be obtained using the second camera 112. This number of users will be described later, but may be used to control the plurality of electronic devices 151 to 154.

For example, the third camera 113 may acquire a third user information approaching the third door 143. The third camera 113 may have a distance sensor function for measuring a distance of a user approaching the third door 143. The distance of the user obtained by the third camera 113 may be used to inform the user that the user cannot enter the third door 143.

For example, the smell sensor 115 may acquire smell information about a user who has entered the first space 100A. The smell information obtained by the smell sensor 115 may be used to determine whether the corresponding user is an abnormal user. For example, the smell information includes the smell of sweat induced by the user, the smell of the armpit, the smell of the feet, and the odor of the odor attached to the user.

As described above, since it is very important to prevent the abnormal user from entering the shelter 100, the embodiment can efficiently determine whether the user is an abnormal user, and also the embodiment can expel the abnormal user out of the shelter 100. That is, in the embodiment, it is determined whether the user is an abnormal user over three rounds, and if the user is an abnormal user, the abnormal user should go out of the shelter 100.

For example, it is primarily possible to determine whether the user is an abnormal user based on the first user information obtained by the first camera 111, and to prevent or to permit for the corresponding user to enter according to the result. For example, secondarily, it may be determined whether the user is an abnormal user based on the smell information obtained by the smell sensor 115, and the corresponding user may be expelled according to the result. For example, thirdly, based on the second user information obtained by the second camera 112, it is determined whether the user is an abnormal user, and the corresponding user may be expelled according to the result.

On the other hand, the plurality of output units 181 to 184 can include at least one first output unit 181 installed near the first entrance door, at least one second output unit 182 installed in the first space 100A, and at least one third output unit 183 installed in the second space 100B and at least one fourth output unit 184 installed near the second door 142. For example, each of the first output unit 181, the second output unit 182, and the third output unit 183 may be a speaker, but is not limited thereto.

For example, the first output unit 181 may output a warning information to a user approaching the first door 141. For example, when the user approaching the first door 141 is an abnormal user, a warning information may be output through the first output unit 181.

For example, the second output unit 182 may output a warning information to the user in the first space 100A. For example, when the user in the first space 100A is an abnormal user, a warning information may be output through the second output unit 182.

For example, the third output unit 183 may output a warning information to the user in the second space 100B. For example, when the user in the second space 100B is an abnormal user, a warning information may be output through the third output unit 183.

For example, the fourth output unit 184 may output a warning information to a user approaching the second door 142.

For example, the warning information output through each of the first to third output units 181, 182, 183 can be a warning for the user to go out of the shelter 100. On the other hand, the warning information output through the fourth output unit 184 may be a warning regarding that the fourth output unit 184 is a door that only goes out and cannot enter through the fourth door. For example, the warning information may be output as a voice, but may also be output as a text message or other delivery method.

Meanwhile, bus arrival related information may be output through each of the first to fourth output units 181~184.

Meanwhile, the plurality of electronic devices 151 to 154 may be installed in the second space 100B. The plurality of electronic devices 151 to 154 may be various electronic devices required to maintain the comfort of the second space 100B, that is, a rest space.

For example, the plurality of electronic devices may include a first electronic device 151, a second electronic device 152, a third electronic device 153, and a fourth electronic device 154. The first electronic device 151 can be at least one UV sterilizer 151, for example, may be installed on the ceiling of the second space 100B, but is not limited thereto. The second electronic device can be at least one or more air purifiers 152, and may be installed, for example, on the ceiling of the second space 100B, but is not limited thereto. The third electronic device can be at least one or more air conditioners 153, and may be installed, for example, on one side wall of the second space 100B. For example, the air conditioner 153 may be installed on one side wall of the second space 100B corresponding to the rear of the shelter 100. The fourth electronic device can be a plurality of lights 154 and may be installed on the ceiling of the second space 100B. For example, various lights such as LED lights, fluorescent lights, lamps, etc. may be installed on the ceiling of the second space 100B or on the wall of the second space 100B. For convenience of explanation, the UV sterilizer 151, the air purifier 152, the air conditioner 153, and the lighting 154 are shown in the drawings as a plurality of electronic devices, but the embodiment has more electronic devices 151 to 154 than this.

For example, the UV sterilizer 151, the air purifier 152, the air conditioner 153, and the lighting 154 may be adjusted by level or variably under the control of the control unit 120. Here, the level is an intensity level set in each of the UV sterilizer 151, the air purifier 152, the air conditioner 153, and the lighting 154, and a plurality of intensity levels may be set. For example, each of these UV sterilizers 151, air purifiers 152, air conditioners 153, and lighting 154 under the control of the control unit 120 may be changed from a currently operated level to a higher or lower level. For example, each of the UV sterilizer 151, the air purifier 152, the air conditioner 153, and the lighting 154 may be variably operated under the control of the control unit 120. That is, since separate levels are not set for each of the UV sterilizer 151, the air purifier 152, the air conditioner 153, and the lighting 154, the UV sterilizer 151, the air purifier 152, the air conditioner 153, and the lighting 154 may be operated to increase or decrease the intensity of each according to the control value provided by the control unit 120. As will be explained later, each of these UV sterilizers 151, air purifiers 152, air conditioners 153, and lights 154 can be variably adjusted based on at least one of the number of users and staying time in the shelter 100 by level.

Meanwhile, the plurality of display units can include at least one first display unit 161 installed inside the shelter 100, for example, on the inner surface of the left glass window. In addition, the plurality of display units can include a second display unit 162 installed outside the shelter 100, for example, on the outer surface of one area of the front windshield 160a. As described above, various information may be displayed on the first display unit 161 and the second display information. For example, the first display unit 161 may display a list of buses scheduled to enter the smart bus platform. By displaying the list of buses scheduled to enter the smart bus platform, the user in the shelter 100 can easily obtain information related to the bus to board.

For example, the second display unit 162 may display information on the number of people scheduled to board the corresponding bus together with the bus list information. As such, information on the number of passengers scheduled to board is displayed through the second display unit 162, so that the driver of the bus arriving at the corresponding bus platform can see and determine if there is a user who will board the arriving bus at the corresponding smart bus platform.

Meanwhile, the air shower 190 may be installed in the first space 100A. For example, the air shower 190 may be installed on the ceiling and/or the wall of the first space 100A.

In order for the user outside the shelter 100 to take a break, the user must go to the second space 100B via the first space 100A. Since the second space 100B is a resting space for users, the user who enters the second space 100B must enter the second space 100B in a clean state, so that the environment of the second space 100B is not polluted and can be maintained in a comfortable state.

Accordingly, the air shower 190 sprays air toward the user who has entered the first space 100A, thereby removing dust on the user's body or clothes. Although not shown, at least one ejector capable of discharging the dust removed from the user may be provided on the floor of the first space 100A.

Therefore, since fine dust and the like are removed from the first space 100A and the user can enter the second space 100B in a clean state, contamination of the second space 100B is minimized, and contamination of the second space 100B can be prevented. And users who have entered the second space 100B can also enjoy a rest in a comfortable state.

Meanwhile, the shelter 100 of the smart bus platform according to the embodiment can include a control unit 120, a storage unit 130, and a communication unit 135. Although not shown in FIG. 2, the control unit 120, the storage unit 130, and the communication unit 135 may be provided inside or outside the shelter 100.

The control unit 120 may perform overall management and control of the shelter 100.

For example, as a first embodiment, the control unit 120 may control the first user information acquired by the first camera 111, the smell information acquired by the smell sensor 115, and the second camera 112. It may be determined whether the user is an abnormal user based on at least one or more of the second user information, and if the determination result indicates that the user is an abnormal user, warning information may be output to the user through the first to third output units 183. The first embodiment will be described in detail with reference to FIGS. 4 to 11.

For example, as a second embodiment, the control unit 120 may control at least one of the plurality of electronic devices 151 to 154 based on at least one of the number of people and the staying time of the users inside the shelter 100. The second embodiment will be described with reference to FIGS. 12 to 22.

Meanwhile, the storage unit 130 obtains a value used to obtain a correction value of a lookup table (see 131 in FIGS. 14 and 132 in FIG. 15) including a weight for at least one of the number of users and the user's staying time. At least one of the plurality of electronic devices 151 to 154 may be controlled using this correction value. The lookup tables 131 and 132 shown in FIGS. 14 and 15 will be used later in the description of the second embodiment.

Meanwhile, the communication unit 135 can communicate with the outside through a network. For example, the shelter 100 is connected to the central control center through the communication unit 135, and may receive a control command from the central control center or transmit various detection signals obtained from the shelter 100 to the central control center. In addition, the communication unit 135 may enable short-range wireless communication or wireless Wi-Fi.

As described above, as a first embodiment, the control unit 120 can determine whether the user is an abnormal user based on at least one or more of the first user information obtained by the first camera 111, the smell information obtained by the smell sensor 115 and the second user information obtained by the second camera 112.

As a result of the determination, the control unit 120 can transmit a warning information to the user through the first to third output units 183, when the user is determined as an abnormal user.

Hereinafter, the first embodiment will be described in detail with reference to FIGS. 4 to 11.

First Embodiment

Figure 4:
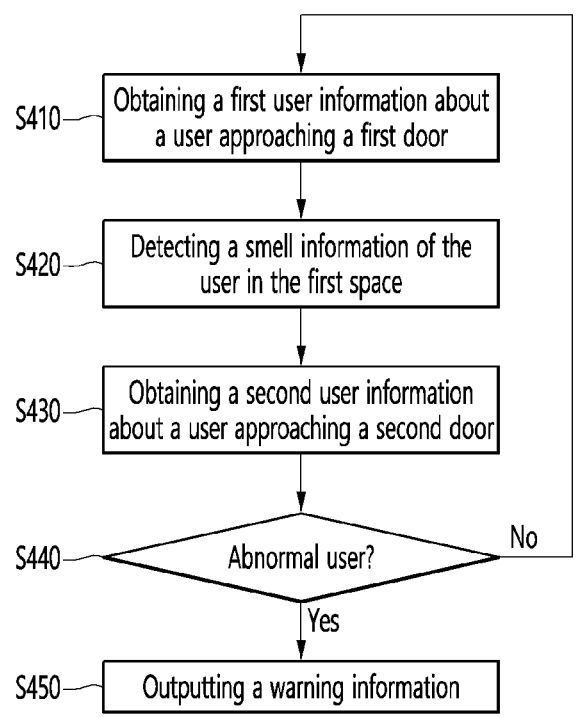
FIG. 4 illustrates a first management method of a shelter in a smart bus platform according to the first embodiment.

FIG. 4 illustrates a first management method of the shelter 100 in the smart bus platform according to the first embodiment.

As shown in FIGS. 2 to 4, when a user approaches the first door 141, at least one first camera 111 installed near the first door 141 can obtain a first user information about the user (S410).

When the user enters the first space 100A of the shelter 100 through the first entrance door 141, the smell sensor 115 installed in the first space 100A detects the smell of the user in the first space 100A and first user information can be obtained (S420).

When the user enters the second space 100B of the shelter 100 through the second entrance door 142, it is possible to obtain a second user information about the incoming user by at least one second camera 112 installed in the second space 100B (S430).

The first user information, the smell information, and/or the second user information may be provided to the control unit 120.

The control unit 120 may determine whether the user is an abnormal user based on at least one of the first user information, the smell information, and the second user information (S440).

The first user information can be an appearance information of the user approaching the first door 141 based on the basis, and it may be determined whether the user is an abnormal user based on the external appearance information.

If the user's hair is tangled or jagged, if user's clothes are covered with dust or dirt, or if user has a severe cut on the face or an ugly tattoo on the arm or leg, the user may be determined to be an abnormal user who should not enter the second space 100B of the shelter 100.

The smell information includes, for example, the smell of sweat, the smell of armpits, the smell of feet, and the smell of odors attached to the user. For example, when a user who has entered the first space 100A smells a strong sweat or a bad odor, the user may be determined as an abnormal user who should not enter the second space 100B of the shelter 100.

The second user information may be behavioral aspect information of the user. For example, when the user sits or lies anywhere, or when the user holds a bottle, drinks, or shouts, the user may be determined as an abnormal user.

When it is determined that the user is an abnormal user, the control unit 120 may output warning information to the user through the first to third output units 181~183 (S450). Warning information may be output through at least one of the first to third output units 181~183. Each of the first to third output units 181~183 may be a speaker, but is not limited thereto. When the user is in the second space 100B, the warning information may be displayed as text through the first display unit 161 installed in the interior of the second space 100B.

Figure 5:
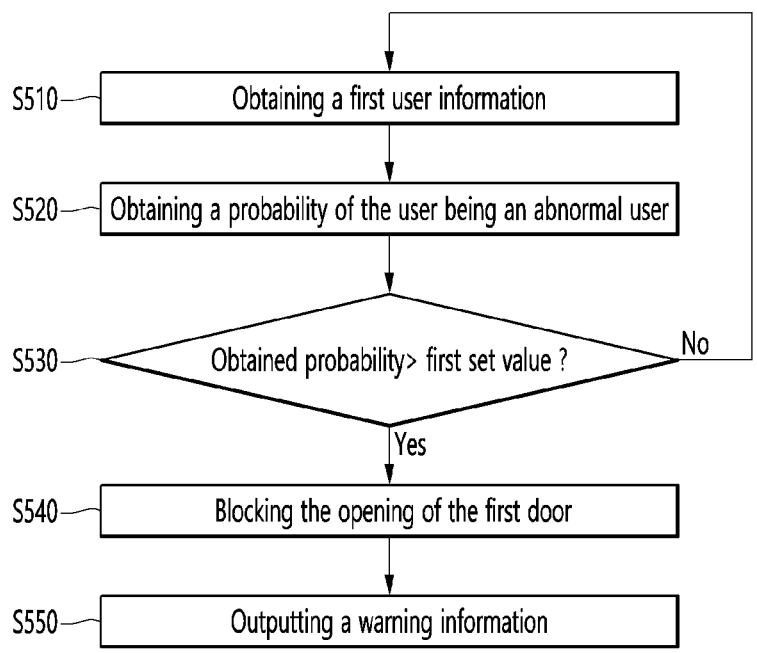
FIG. 5 illustrates a second management method of a shelter in a smart bus platform according to the first embodiment.

FIG. 5 illustrates a second management method of a shelter in a smart bus platform according to the first embodiment.

As shown in FIGS. 2,3 and 5, when a user approaches the first door 141, at least one first camera 111 may acquire a first user information (S510). S510 may be the same as S410 shown in FIG. 4 and the first user information may be provided to the control unit 120.

The control unit 120 may obtain a probability that the user is an abnormal user based on the first user information (S520). The corresponding probability may be calculated by a pre-designed algorithm. For example, the probability may be calculated based on the number of unclean areas extracted from the user or the size of the unclean areas. For example, as the number of unclean areas increases or the size of the unclean areas increases, the probability that the corresponding user is an abnormal user may increase.

The control unit 120 may determine whether the obtained probability is greater than a first set value (S530).

If the obtained probability is greater than the first set value, the control unit 120 blocks the opening of the first door 141 (S540), so that the user outside the shelter 100 can be prevented from entering into a first space 100A in the shelter 100.

When the obtained probability is greater than the first set value, the control unit 120 may output a guide information through the first output unit 181 installed near the first door 141 (S550). The guide information may be output through the second output unit 182 or the third output unit 183.

The order of S540 and S550 may be reversed. That is, after S550 is performed first, S540 may be performed. Alternatively, S540 and S550 may be performed simultaneously.

On the other hand, when the obtained probability is less than or equal to the first set value, the user is determined to be a normal user, and the control unit 120 opens the first door 141 so that the user can enter the first space 100A.

Therefore, it is determined whether the user is an abnormal user outside the shelter 100, and only normal users can enter the shelter 100, so that the effective management of the shelter 100 and the convenience or comfort of users in the shelter 100 can be promoted.

Figure 6:
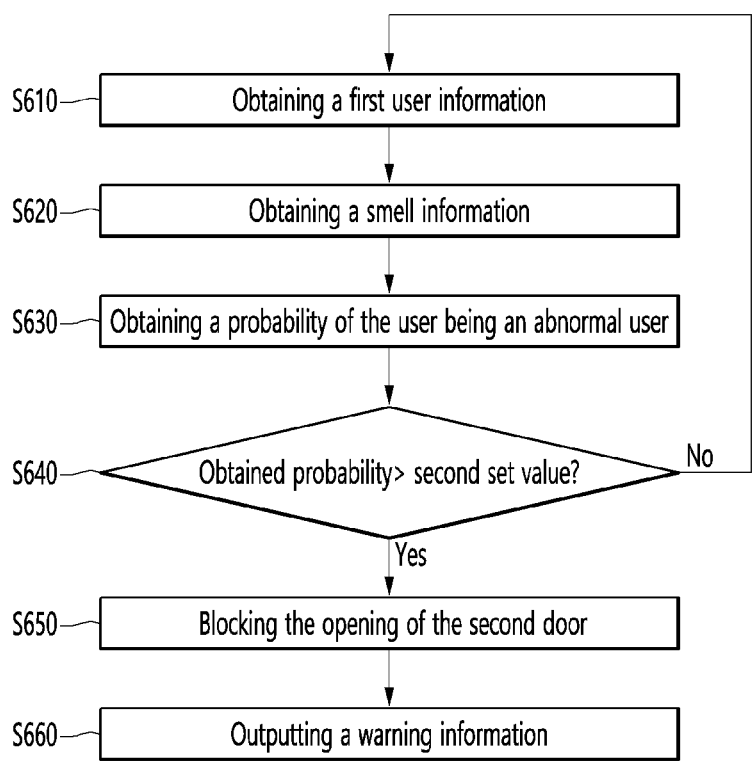
FIG. 6 illustrates a third management method of a shelter in the smart bus platform according to the first embodiment.

FIG. 6 illustrates a third management method of a shelter in the smart bus platform according to the first embodiment.

As shown in FIGS. 2, 3 and 6, when a user approaches the first door 141, at least one first camera 111 may acquire first user information (S610). S610 may be the same as S410 or S510 and the first user information may be provided to the control unit 120.

When the user enters the first space 100A of the shelter 100, at least one smell sensor 115 may acquire smell information about the user (S620). Smell information about the user may be provided to the control unit 120.

The control unit 120 may acquire a probability that the corresponding user is an abnormal user based on the first user information and the smell information (S630).

The first user information and the smell information may be information obtained from the same user. The corresponding probability may be calculated by a pre-designed algorithm. For example, a corresponding probability may be obtained by quantifying or weighting the first user information and the smell information, and adding or multiplying the corresponding number or weight, but the present invention is not limited thereto.

For example, even if the user is not an abnormal user according to the first user information and the corresponding user can enter the first space 100A through the first door 141, the corresponding user may be determined as an abnormal user by the obtained probability of being an abnormal user based on the first user information and the smell information. For example, based on the first user information, there is no flaw in the appearance of the corresponding use area, and the corresponding user can enter the first space 100A of the shelter 100 through the first entrance door 141. However, when a severe odor is emitted from the user based on the smell information about the user obtained in the first space 100A, the user may be determined to be an abnormal user.

The control unit 120 may determine whether the obtained probability is greater than a second set value (S640).

When the obtained probability is greater than the second set value, the control unit 120 blocks the opening of the second door 142 (S650), so that the user of the first space 100A enters the second space 100B can be prevented from entering into the second space. When the obtained probability is greater than the second set value, the control unit 120 may output guide information through the second output unit 182 installed in the first space 100A (S660). The guide information may be output through the first output unit 181 or the third output unit 183.

The order of S650 and S660 may be reversed. That is, S660 may be performed first, and then S650 may be performed. Alternatively, S650 and S660 may be performed simultaneously.

On the other hand, when the obtained probability is less than or equal to the second set value, the user can be determined to be a normal user, and the control unit 120 opens the second door 142 so that the user can enter the second space 100B.

Therefore, it is determined whether the user is an abnormal user in the first space 100A of the shelter 100, and only normal users can enter the second space 100B of the shelter 100, so it is possible to improve the convenience or comfort of users in the management and shelter 100.

Figure 7:
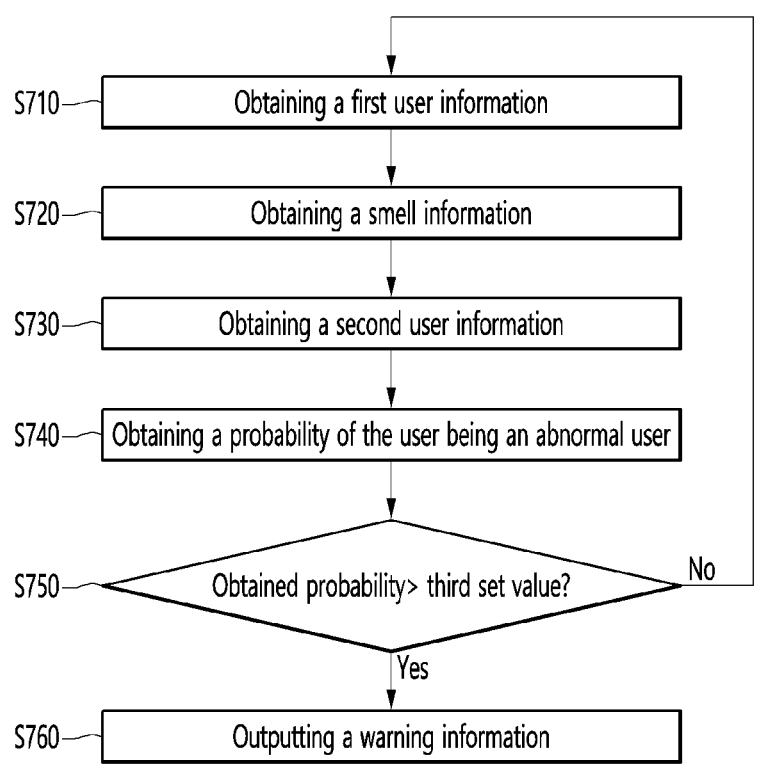
FIG. 7 illustrates a fourth management method of a shelter in the smart bus platform according to the first embodiment.

FIG. 7 illustrates a fourth management method of a shelter in the smart bus platform according to the first embodiment.

As shown in FIGS. 2, 3 and 7, when a user approaches the first door 141, at least one first camera 111 may acquire first user information (S710). S710 may be the same as S410, S510, or S610 and the first user information may be provided to the control unit 120.

When the user enters the first space 100A of the shelter 100 through the first door 141, at least one smell sensor 115 may acquire smell information about the user (S720). S720 may be the same as S420 or S620. Smell information about the user may be provided to the control unit 120.

When the user enters the second space 100B of the shelter 100 through the second entrance door 142, it is possible to obtain second user information about the incoming user (S730). For example, at least one second camera 112 installed in the second space 100B can obtain second user information about the incoming user who moves to the second space 100B. S730 may be the same as S430.

The control unit 120 may acquire a probability that the corresponding user is an abnormal user based on at least one of the first user information, the smell information, and the second user information (S740). The first user information, the smell information, and the second user information may be information obtained from the same user. The corresponding probability may be calculated by a pre-designed algorithm. For example, the first user information, the smell information, and the second user information may be digitized or weighted, and a corresponding probability may be obtained by adding or multiplying the corresponding number or weight, but the present invention is not limited thereto.

The control unit 120 may determine whether the obtained probability is greater than a third set value (S750).

When the obtained probability is greater than the third set value, the control unit 120 may output a guide information through the third output unit 183 installed in the second space 100B (S760). The guide information may be output through the first output unit 181 or the second output unit 182.

On the other hand, when the obtained probability is less than or equal to the third set value, the corresponding user is determined as a normal user, and the control unit 120 may not perform any operation related to the user's exit.

Therefore, it is determined whether the user is an abnormal user in the second space 100B of the shelter 100, and only normal users can stay in the second space 100B of the shelter 100, so it is possible to effectively improve the convenience or comfort of users in the management and shelter 100.

Figure 8:
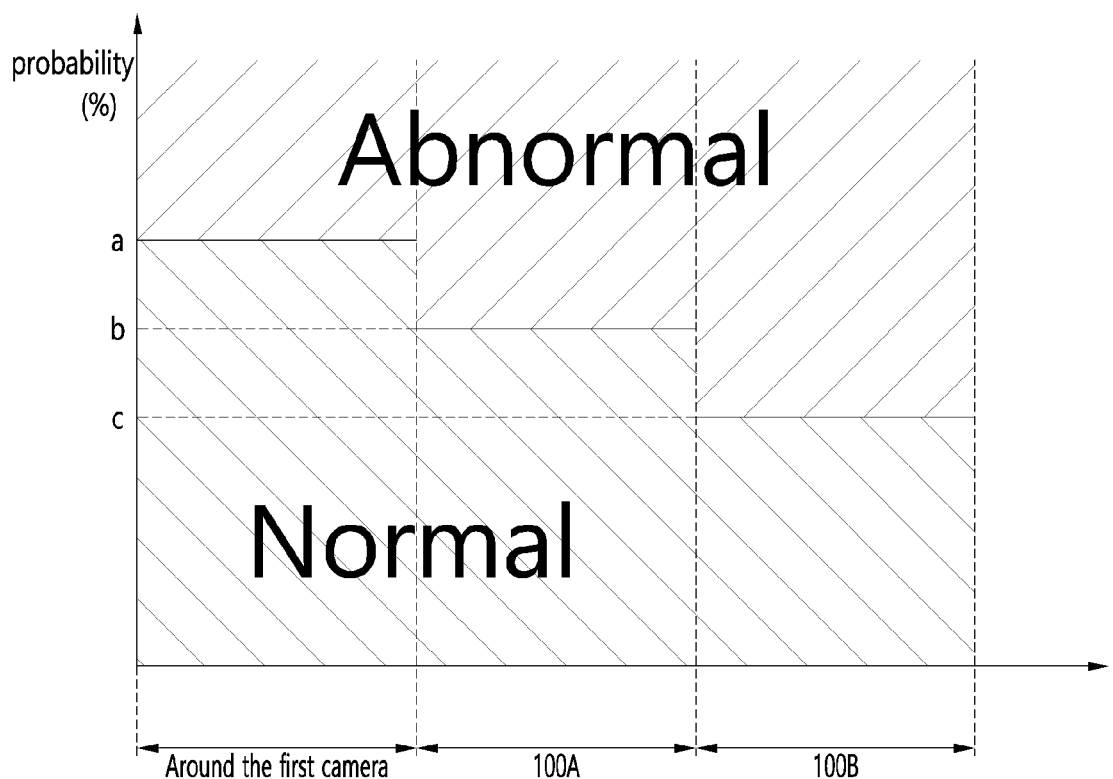
FIG. 8 shows a set value for determining a normal user and an abnormal user.

FIG. 8 shows a set value for determining a normal user and an abnormal user.

As shown in FIG. 8, the first set value (a) may be equal to or greater than the second set value (b), and the second set value (b) may be equal to or greater than the third set value (c).

The first set value (a) may be the first set value shown in S530 of FIG. 5, the second set value (b) may be the second set value shown in S640 of FIG. 6, and the third set value (c) may be a third setting value set in the illustrated S750 of FIG. 7.

In FIG. 5, it is determined whether the user is an abnormal user using only the first user information, and the first set value (a) can be set higher than the second set value (b) or the third set value (c) in order to increase the criterion for determining the abnormal user.

In FIG. 6, since it is determined whether the user is an abnormal user by using the smell information as well as the first user information, the accuracy of whether the user is an abnormal user may be increased compared to that in FIG. 5. Therefore, even if the second set value (b) is set to be smaller than the first set value (a), the accuracy of whether an abnormal user is present may be greater than in FIG. 5.

In FIG. 7, since it is determined whether the user is an abnormal user using the second user information as well as the first user information and the smell information, the accuracy of whether an abnormal user is present can be increased compared to that of FIGS. 5 and 6. Therefore, even if the third set value (c) is set to be smaller than the first set value (a) or the second set value (b), the accuracy of whether the user is an abnormal user can be greater than in FIGS. 5 and 6.

If all of the first set value (a), the second set value (b), and the third set value (c) are the same, the accuracy of whether the user is abnormal in FIG. 6 may be greater than in FIG. 5. In addition, the accuracy of whether an abnormal user is present in FIG. 7 may be greater than in FIG. 6. Even if the user enters the first space 100A of the shelter 100 through the first entrance door 141, the user may be determined as an abnormal user in the first space 100A. Also, even if the user enters the second space 100B of the shelter 100, the user may be determined as an abnormal user in the second space 100B.

Therefore, according to the embodiment, outside the shelter 100, in the first space 100A of the shelter 100 and in the second space 100B of the shelter 100, it is sequentially determined whether the user is an abnormal user. As soon as it is determined, the user can be expelled out of the shelter 100. Therefore, the normal user in the shelter 100 can be protected from abnormal users, and the effective management of the shelter 100 is possible.

Figure 9:
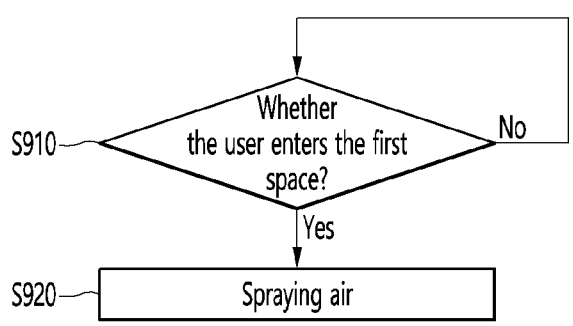
FIG. 9 illustrates a fifth management method of a shelter in the smart bus platform according to the first embodiment.

FIG. 9 illustrates a fifth management method of a shelter in the smart bus platform according to the first embodiment.

Referring to FIGS. 2, 3 and 9, when the user enters the first space 100A (S910), the control unit 120 controls the air shower 190 so that air is sprayed toward the user.

Fine dust, etc. attached to the user may be removed by air jetting. The user's entry into the first space 100A may be detected through an opening/closing sensor (not shown) of the first door 141. In order for a user outside the shelter 100 to enter the first space 100A of the shelter 100, the first door 141 may be opened.

As described above, when the first user information under the jurisdiction of the user outside the shelter 100 is obtained by the first camera 111, and the user is determined to be a normal user based on the obtained first user information, the control unit 120 controls the first door 141 to be opened. The first door 141 is opened so that the user can enter the first space 100A of the shelter 100. At this time, the opening of the first door 141 is detected by the opening/closing sensor, and as a result of the detection, the control unit 120 may control the air shower 190 to spray air. Accordingly, foreign substances or fine dust, etc. attached to the user who entered the first space 100A of the shelter 100 through the first entrance door 141 may be removed by the air sprayed from the air shower 190.

For example, it is determined that the user is a normal user through the first user information obtained by the first camera 111, and the first door 141 is opened to enter the first space 100A of the shelter 100. However, when a stench is emitted from a foreign substance attached to the user entering the first space 100A, the user is determined to be an abnormal user through the smell information obtained by the smell sensor 115 installed in the first space 100A such that it may not be possible to enter the second space 100B.

In this case, when the odorous foreign material of the user is removed by the air shower 190 in the first space 100A, the probability of determining that the user is a normal user rather than an abnormal user for the user is increased, and the user can be regarded as a second user who can enter the second space 100B.

Accordingly, the determination accuracy for the abnormal user can be further improved. That is, the smell sensor 115 continuously and in real time acquires smell information from the user until the user enters the first door 141 and approaches the second door 142, and thus the obtained smell information can be obtained in real time. The intensity of the smell can be identified based on the smell information, and it can be determined whether the user is an abnormal user based on the detected intensity of the smell, so the identification accuracy of the abnormal user can be further improved.

In addition, the embodiment may further include an air intake unit (not shown) in the first space (100A). The smell sensor 115 may analyze the air containing the user's smell captured by the air intake unit after being sprayed to the user by the air shower 190. Accordingly, there is a technical effect that can determine whether the user is an abnormal user.

That is, according to the embodiment, not only the function of removing foreign substances or odors of the user by the air shower 190, but also the odors from various parts of the user's body by the air shower 190 can be more quickly collected in the air intake unit. Accordingly, there is a special technical effect that can more quickly and accurately determine whether the user is abnormal by the smell sensor 115.

On the other hand, the air shower 190 may be sprayed with a fragrance such as perfume instead of air, or air and fragrance may be sprayed at the same time.

Figure 10:
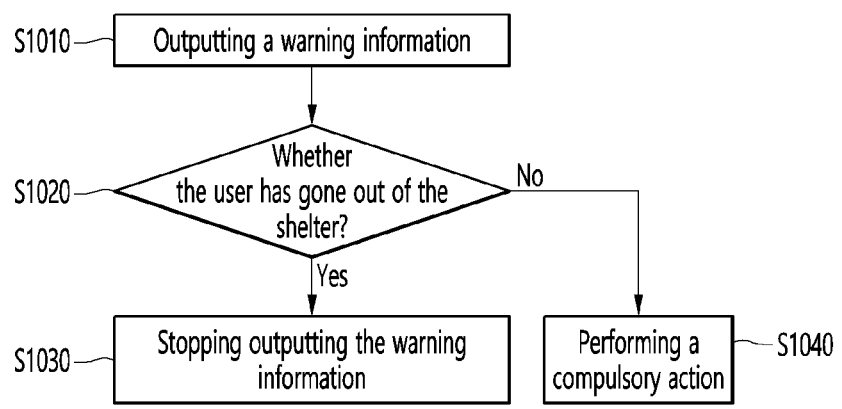
FIG. 10 illustrates a sixth management method of a shelter in the smart bus platform according to the first embodiment.

FIG. 10 illustrates a sixth management method of a shelter in the smart bus platform according to the first embodiment.

Referring to FIGS. 2, 3 and 10, if the user is determined as an abnormal user outside the shelter 100, or in the first space 100A of the shelter 100, or the second space 100B of the shelter 100, a warning information may be output to the corresponding user through at least one of the first output unit 181, the second output unit 182, and the third output unit 183 (S1010).

The control unit 120 may determine whether the user has gone out of the shelter 100 (S1020). If the user is outside the shelter 100, it may be determined whether an image is not captured by the user at least one first camera 111 installed near the first entrance door 141.

Whether the user went out of the shelter 100 can be determined by whether the first door 141 is reopened because the opening of the second door 142 is blocked when the user is in the first space 100A. Whether the user went out of the shelter 100 can be determined by whether the third door 143 through which the user can exit from the second space 100B is opened when the user is in the second space 100B. An opening/closing sensor may be installed at the first door 141 or the third door 143 to detect whether the first door 141 or the third door 143 is opened. The opening/closing sensor may be installed on the second door 142.

When it is determined that the user has gone out of the shelter 100, the control unit 120 may stop outputting the warning information (S1030).

When it is determined that the user has not gone out of the shelter 100, the control unit 120 may perform a compulsory action (S1040). It is possible to create an unpleasant environment as a coercive measure. For example, it is possible to spray odor liquid, blowing liquid or water, or spray smoke.

When the user goes out of the shelter 100 by spraying the malodorous liquid or blowing liquid, the unpleasant odor can be removed by ventilating the space, for example, the first space 100A or the second space 100B.

If there are users who are already resting in the second space 100B of the shelter 100, other compulsory measures, such as reporting to the central control center or contacting control personnel, rather than creating an unpleasant environment, may be performed.

Therefore, in the embodiment, by allowing the abnormal user to quickly go out of the shelter 100, it is possible to create a more comfortable environment more quickly.

Figure 11:
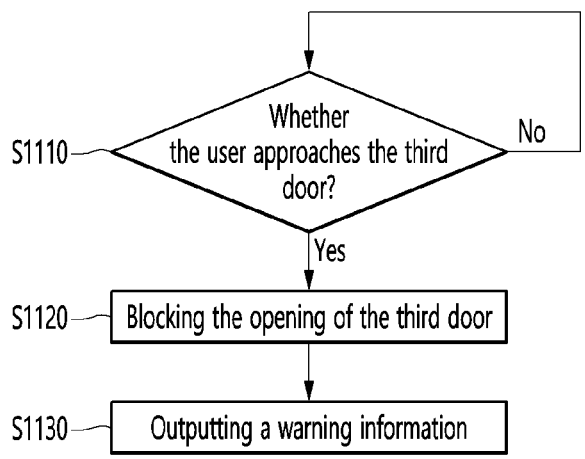
FIG. 11 illustrates a seventh management method of a shelter in the smart bus platform according to the first embodiment.

FIG. 11 illustrates a seventh management method of a shelter in the smart bus platform according to the first embodiment.

Referring to FIGS. 2, 3, and 11, when the user approaches the third door 143, the third camera 113 installed near the third door 143 can obtain a third user information. The third user information may be provided to the control unit 120. The control unit 120 may determine whether the user approaches the third door 143 based on the third user information (S1110). As described above, the third camera 113 may have a distance sensor function for measuring a distance of a user approaching the third door 143. In this case, the third user information can be a distance information, and the control unit 120 may determine whether the user approaches the third door 143 based on the distance information.

When the user approaches the third door 143, the control unit 120 may block the opening of the third door 143 (S1120). In order to perform an operation of blocking the opening of the third door 143, a distance obtained from the third camera 113 may be compared with a preset distance value. Accordingly, when the obtained distance is smaller than a preset distance value, the control unit 120 may block the opening of the third door 143.

The control unit 120 may output a warning information through the fourth output unit 184 installed near the third door 143 (S1130). The warning information may be information including that it is impossible to enter the shelter 100 through the third door 143 and to guide entering the shelter 100 through the first door 141. The order of S1120 and S1130 may be reversed. That is, after 1130 is performed first, S1120 may be performed. In addition, S1120 and S1130 may be performed simultaneously.

Meanwhile, as a second embodiment, the control unit 120 may control at least one of the plurality of electronic devices 151 to 154 based on at least one of the number of people and the staying time of the users inside the shelter 100.

In the second embodiment, when a normal user enters the second space 100B through the first space 100A of the shelter 100, users on the second space 100B take a break in the second space 100B. A technology for optimally creating the indoor environment of the second space 100B while waiting for the bus to board is proposed.

Hereinafter, the second embodiment will be described in detail with reference to FIGS. 12 to 22.

Second Embodiment

Figure 12:
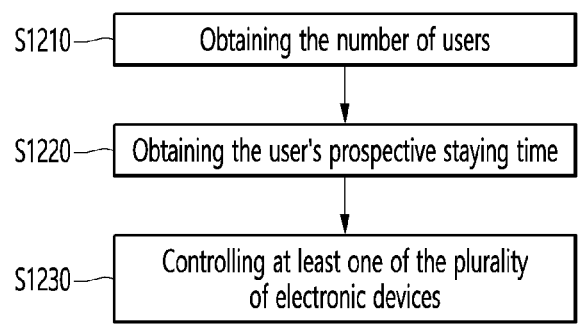
FIG. 12 illustrates a first management method of a shelter in a smart bus platform according to the second embodiment.
Figure 13:
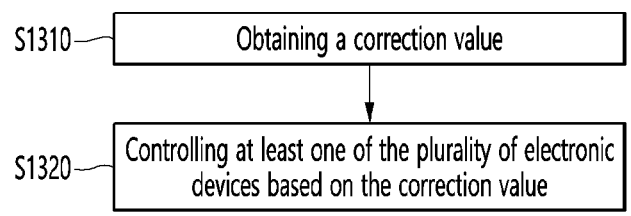
FIG. 13 is a detailed description of S1230 of FIG. 12.

FIG. 12 illustrates a first management method of a shelter in a smart bus platform according to the second embodiment. FIG. 13 is a detailed description of S1230 of FIG. 12.

Referring to FIGS. 2, 3 and 12, the control unit 120 may obtain the number of users in the second space 100B of the shelter 100 (S1210).

At least one second camera 112 may be installed in the second space 100B. For example, the second camera 112 may be a thermal imaging camera. By means of the thermal imaging camera, a user and a background can be distinguished, and a distinction can be made between users. Accordingly, the number of users in the second space 100B can be obtained by using the thermal imaging camera.

Also, the control unit 120 may obtain the user's prospective staying time (S1220).

As an example, the prospective staying time of the user can be determined from the time the second door 142 is opened for the user to enter the second space 100B from the first space 100A of the shelter 100 until the user boards his or her bus. It may be the time until it goes out through the third door 143 for the purpose.

As another example, the user's prospective staying time can be displayed on the first display unit 161 from the time the second door 142 is opened for the user to enter the second space 100B from the first space 100A of the shelter 100. It may be a difference between the estimated arrival times of the selected bus when a bus to be boarded is selected from the list of buses displayed in. For example, the time at which the second door 142 is opened for the user to enter the second space 100B is 3:10 pm, and the user entering the second space 100B is displayed on the first display unit 161. When the estimated arrival time of the bus selected from the displayed bus list is 3:15 pm, the user's prospective staying time in the second space 100B may be 5 minutes.

In addition, the prospective staying time of the user may be obtained in various ways. In S1220, the user's prospective staying time may mean an average prospective staying time of at least one or more users. This will be described in detail later with reference to FIG. 18.

The control unit 120 may control at least one of the plurality of electronic devices 151 to 154 based on at least one of the number of users and the prospective staying time of the users inside the shelter 100 (S1230). As shown in FIGS. 2 and 3, the plurality of electronic devices may include at least one UV sterilizer 151, one or more air purifiers 152, one or more air conditioners 153, and a plurality of lights 154.

As shown in FIG. 13, the control unit 120 may obtain a correction value based on at least one of the number of users and the prospective staying time in the shelter 100 (S1310).

The control unit 120 may control at least one of the plurality of electronic devices 151 to 154 based on the obtained correction value (S1320).

The correction value can be obtained as one correction value, and based on the correction value, at least one of the plurality of electronic devices 151 to 154 can be adjusted for each of the plurality of electronic devices corresponding to each correction value.

The correction value may be a value for correcting the control value from the current control value in order to control the electronic device. For example, when the current control value in the UV sterilizer 151 is operated as a control value corresponding to one level, the compensation value may be a control value increased from one level to three levels. Accordingly, the UV sterilizer 151 may be operated at three levels according to the corresponding compensation value.

On the other hand, the number of users and the prospective staying time of the user in the second space 100B of the shelter 100 may be changed at any time according to time. As the number of users or prospective staying time is changed, the indoor environment of the second space 100B of the shelter 100 may also be changed. For example, when the number of users increases or the prospective staying time increases, the indoor environment of the second space 100B of the shelter 100 may deteriorate. For example, the temperature inside the shelter 100 may rise and users may feel the heat. For example, the air quality or air condition inside the shelter 100 may deteriorate.

However, in the related art, since a plurality of electronic devices are operated according to a fixed set value, even if the indoor environment deteriorates due to a change in the number of users or a prospective staying time, it is impossible to actively cope with the deterioration.

On the other hand, in the embodiment, the plurality of electronic devices 151 to 154 can be controlled based on the number of users or the prospective staying time. Accordingly, the embodiment can actively cope with changes in the indoor environment, and can accelerate the popularization of the shelter 100 by increasing the user's possibility of using the shelter 100.

Hereinafter, a lookup table including a weight for obtaining a correction value will be described with reference to FIGS. 14 and 15.

Figure 14:
FIG. 14 is a first exemplary diagram of a lookup table.

FIG. 14 is a first exemplary diagram of a lookup table. Referring to FIG. 14, the lookup table 131 may include a weight for the number of users. For example, different weights a1 to a30 may be assigned to each other according to the number of users. These weights a1 to a30 may be changed as necessary. A correction value may be obtained based on the weights a1 to a30 included in the lookup table 131.

Figure 15:
FIG. 15 is a second exemplary view of a lookup table.

FIG. 15 is a second exemplary view of a lookup table.

As shown in FIG. 15, the lookup table 132 may include a weight for the average prospective staying time of the user. For example, different weights b1 to b30 may be assigned to each other according to the average prospective staying time of the user. These weights b1 to b30 may be changed as needed. The acquisition of the average prospective staying time of the user will be described in detail later with reference to FIG. 18.

A correction value may be obtained based on the weights b1 to b30 included in the lookup table 132.

Meanwhile, although not shown, when both the number of users and the prospective staying time of users are considered for controlling a plurality of electronic devices, another weight may be obtained by a combination of the weights a1 to a30 illustrated in FIG. 14 and the weights b1 to b30 illustrated in FIG. 15. Another lookup table may be generated based on another weight. Accordingly, a correction value may be obtained based on another weight included in another lookup table.

Figure 16:
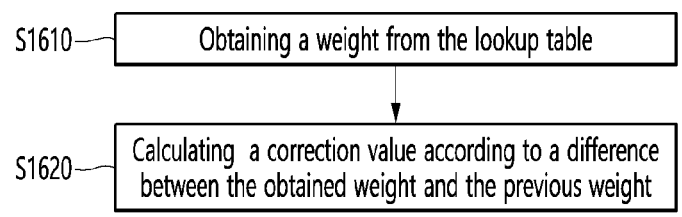
FIG. 16 illustrates a second management method of a shelter in a smart bus platform according to the second embodiment.

FIG. 16 illustrates a second management method of a shelter in a smart bus platform according to the second embodiment.

Referring to FIGS. 2, 3, and 16, the control unit 120 may obtain a weight from the lookup table (S1610). The lookup table may include the lookup table 131 shown in FIG. 14 or the lookup table 132 shown in FIG. 15. In addition, the lookup table may include a lookup table created by another weight by a combination of the weights a1 to a30 included in the lookup table 131 shown in FIG. 14 and the weights b1 to b30 included in the lookup table 132 shown in FIG. 15.

For example, when the number of users is 30, the control unit 120 may obtain a30 from the weights from the lookup table 131 shown in FIG. 14.

The control unit 120 may obtain a correction value according to a difference between the obtained weight and the previous weight. For example, when the obtained weight is a30 and the previous weight is a25, (a30-a25) may be obtained as a correction value.

At least one of the plurality of electronic devices 151 to 154 may be adjusted using this correction value (S1320 of FIG. 13).

Meanwhile, when the plurality of electronic devices 151 to 154 are adjusted whenever a correction value is obtained, power consumption for operating the plurality of electronic devices 151 to 154 may increase. In addition, when the plurality of electronic devices 151 to 154 are frequently adjusted as described above, operation noise can be generated due to the operation of the plurality of electronic devices 151 to 154 and the temperature inside the shelter 100 can be frequently changed. Then, it may give discomfort to users in the shelter 100. Therefore, there is a need to propose a technique to solve this problem.

Figure 17:
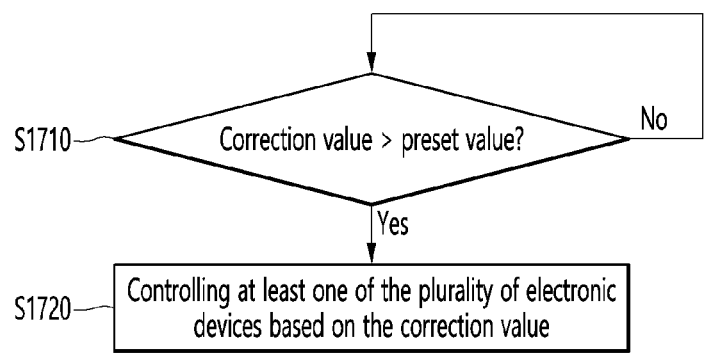
FIG. 17 illustrates a third management method of a shelter in a smart bus platform according to the second embodiment.

FIG. 17 illustrates a third management method of a shelter in a smart bus platform according to the second embodiment.

Referring to FIGS. 2, 3, and 17, when the correction value is greater than or equal to a preset value (S1710), the control unit 120 controls one or more of the plurality of electronic devices 151 to 154 based on the correction value (S1720).

Referring to FIGS. 16 and 17, as shown in FIG. 16, when a correction value is obtained, it may be determined whether the correction value is equal to or greater than a preset value. When the preset value is 3, only when the correction value obtained in FIG. 16 is 3 or more, one or more of the plurality of electronic devices 151 to 154 may be controlled based on the correction value.

Accordingly, in the embodiment, it is possible to reduce power consumption and maintain a comfortable indoor environment by preventing the plurality of electronic devices from being adjusted too frequently.

Figure 18:
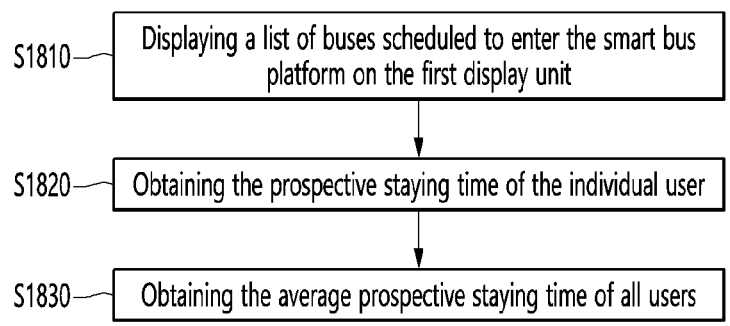
FIG. 18 illustrates a fourth management method of a shelter in a smart bus platform according to the second embodiment.

FIG. 18 illustrates a fourth management method of a shelter in a smart bus platform according to the second embodiment.

Referring to FIGS. 2, 3, and 18, the control unit 120 may display a list of buses scheduled to enter the smart bus platform through the first display unit 161 (S1810). Specifically, that is, the type of bus (e.g. general bus, wide-area bus, express bus, etc.), vehicle number information of the bus, the number of remaining seats of the corresponding bus, estimated arrival time information, arrival time information, and the like may be displayed.

The control unit 120 may obtain the prospective staying time of the individual user (S1820).

A user who has entered the shelter 100, that is, the second space 100B of the shelter 100, can check the bus to board through the first display unit 161 or a smart phone application.

When there is a bus to be boarded on the first display unit 161, the corresponding bus may be selected. The control unit 120 may acquire the prospective staying time of the corresponding user based on the selection time of the corresponding bus and the expected arrival time of the corresponding bus.

In this way, the prospective staying time of each user in the shelter 100 can be effectively and precisely obtained.

The control unit 120 may obtain the average prospective staying time of all users (S1830).

For example, the control unit 120 may obtain the average prospective staying time of all users by averaging the prospective staying time of each individual user. The average prospective staying time obtained in this way may mean the prospective staying time in S1220 of FIG. 12.

Accordingly, in the embodiment, the average prospective staying time of all users can be also obtained in addition to the prospective staying time of individual users, and the plurality of electronic devices 151 can be adjusted based on the obtained average prospective staying time, thereby controlling the plurality of electronic devices 151 to 154 can be more precisely and effectively controlled to create a more comfortable indoor environment.

Figure 19:
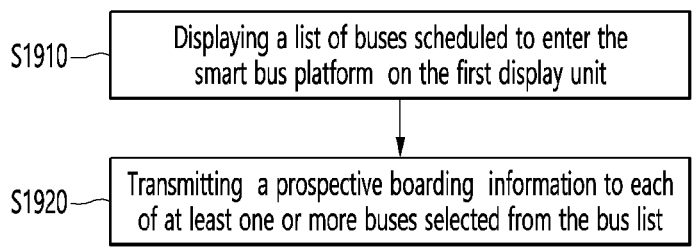
FIG. 19 illustrates a fifth management method of a shelter in a smart bus platform according to the second embodiment.

FIG. 19 illustrates a fifth management method of a shelter in a smart bus platform according to the second embodiment.

Referring to FIGS. 2, 3, and 19, the control unit 120 may display a list of buses scheduled to enter the smart bus platform through the first display unit 161 (S1910).

The control unit 120 may transmit passenger information to a bus selected by each of at least one or more users from the list of buses displayed on the first display unit 161. The prospective boarding information may be information on the number of people scheduled to board the bus to which the information is transmitted from the corresponding smart platform.

Figure 20:
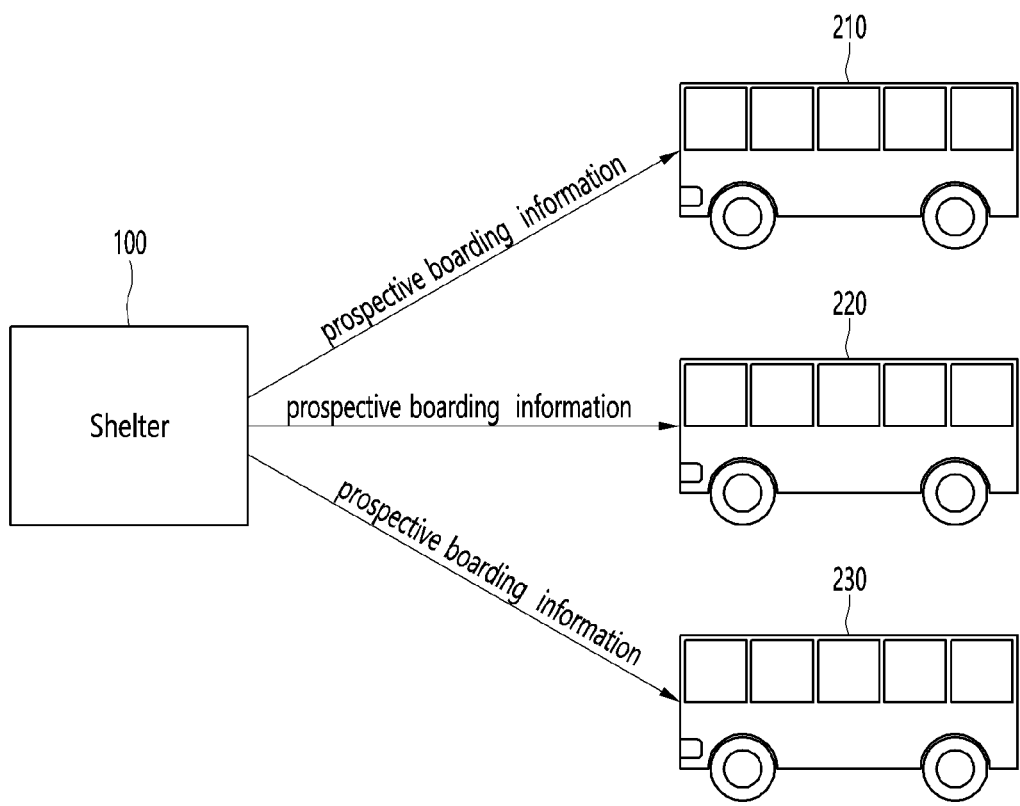
FIG. 20 shows a state in which passenger information is transmitted from the shelter to each bus.

As shown in FIG. 20, when the first bus 210 is selected from the list of buses displayed on the first display unit 161 of the shelter 100, the boarding information including information on the number of people scheduled to board the first bus 210 can be transmitted to the first bus 220.

When the second bus 220 is selected from the list of buses displayed on the first display unit 161 of the shelter 100, the boarding information including the number of prospective passengers can be transmitted to the second bus 220.

When the third bus 230 is selected from the list of buses displayed on the first display unit 161 of the shelter 100, the boarding information including the number of prospective passengers can be transmitted to the third bus 230.

For example, when the first bus 210 is selected by another user after information of one passenger is transmitted to the first bus 210, information of two passengers may be transmitted to the first bus 210. Alternatively, when the first bus 210 is selected by another user after one passenger information is transmitted to one bus 210, the count information of one person is transmitted to the first bus 210 as passenger information. One previously received person and another newly received person may be counted and displayed on the display unit of the bus 210 to display information on two passengers.

In an embodiment, information on the number of prospective boarding passenger to board the bus scheduled to arrive at the corresponding smart bus platform may be transmitted to the corresponding bus. Therefore, the embodiment can help the driver by knowing in advance how many people will be boarding at the corresponding smart bus platform. In particular, there is a special technical effect that can fundamentally solve the problem of no-stop in which a bus driver passes a bus platform even though there is a prospective boarding passenger.

FIG. 21 illustrates a sixth management method of a shelter in a smart bus platform according to the second embodiment.

Referring to FIGS. 2, 3 and 21, the control unit 120 may display a list of buses scheduled to enter the smart bus platform on the first display unit 161 (S2110).

When a bus is selected from the list of buses displayed on the first display unit 161, the control unit 120 can display vehicle number information and information on the number of prospective boarding passengers for the corresponding bus on the second display unit 162(S2120).

As shown in FIG. 22, information on the vehicle number of each bus selected by users in the shelter 100 and information on the number of prospective passengers may be displayed on the second display unit 162.

Whenever different users select the same bus, the number of prospective boarding passengers may increase or change.

The second display unit 162 is installed outside the front of the shelter 100 and can be easily seen by the driver of the bus entering the smart bus platform.

In addition to the bus list information, information on the number of prospective boarding passenger to board the corresponding bus may be displayed. Alternatively, information on the number of prospective passengers may be included in the bus list information.

In the embodiment, information on the number of prospective boarding passenger to board the bus at the smart bus platform can be displayed on the second display unit 162 that can be easily seen by the driver of the bus entering the smart bus platform, so it can help drivers drive by easily knowing whether there are any passengers on their bus and how many will be on board.

Meanwhile, although not shown, when at least one of the number of users and the user's prospective staying time is changed, the control unit 120 may control at least one of the plurality of electronic devices 151 to 154.

In addition, when the user in the shelter 100 goes outside and there is no user, the control unit 120 may control at least one of the plurality of electronic devices 151 to 154 to a preset temperature.

The above detailed description should not be construed as restrictive in all respects and should be considered as illustrative. The scope of the embodiments should be determined by a reasonable interpretation of the appended claims, and all modifications within the equivalent scope of the embodiments are included in the scope of the embodiments.

REFERENCE SIGN OF DRAWINGS

| | |
|---|---|
| 100: shelter | 100A: first space |
| 100B: second space | 111 to 113: camera |
| 115: smell sensor | 120: control unit |
| 130: storage | 135: communication department |
| 131, 132: lookup table | 141 to 143: entrance door |
| 151: UV sterilizer | 152: air purifier |
| 153: air conditioner | 154: lighting |
| 160a, 160b: glass window | 161, 162: display unit |
| 181 to 184: output unit | 190: air shower |
| 210, 220, 230: Bus | |

The invention claimed is:

1. Automatic control system of smart bus platform equipped with a shelter, comprising:
a plurality of electronic devices and a control unit provided in the shelter; and
a first display unit installed inside the shelter for displaying a list of buses scheduled to enter the bus stop,
wherein the first display displays each boarding information of at least one bus selected by a prospective boarding passenger from the list of buses scheduled to enter,
wherein the control unit acquires a prospective staying time of each user based on an expected arrival time of each of at least one or more buses selected from the list of buses scheduled to enter,
wherein the control unit controls at least one of the plurality of electronic devices based on a number of users in the shelter and the prospective staying time, and
wherein the electronic device comprises at least one of a UV sterilizer, an air purifier, an air conditioner, or a lighting.

2. The automatic control system of smart bus platform according to claim 1,
wherein the shelter includes a storage unit, and
wherein the storage unit includes a lookup table having a weight for the number of the users and the prospective staying time.

3. The automatic control system of smart bus platform according to claim 2,
wherein the control unit obtains the weight from the lookup table based on the number of users and the prospective staying time of the user, and
wherein the control unit adjusts at least one device among the plurality of electronic devices based on a correction value according to a difference between the obtained weight and the previous weight.

4. The automatic control system of smart bus platform according to claim 3, wherein the control unit controls the at least one device among the plurality of electronic devices based on the correction value when the correction value is greater than or equal to a preset value.

5. The automatic control system of smart bus platform according to claim 1, wherein the control unit obtains an average prospective staying time of all users based on the obtained prospective staying time of each user.

6. The automatic control system of smart bus platform according to claim 1, wherein the control unit controls at least one or more of the plurality of electronic devices for each level or variably based on the number of users in the shelter and the prospective staying time.

7. The automatic control system of smart bus platform according to claim 1, wherein the shelter further comprises a thermal imaging camera for detecting the user, and
wherein the control unit obtains the number of users based on the users detected by the thermal imaging camera.

8. Automatic control system of smart bus platform equipped with a shelter, comprising:
a plurality of electronic devices and a control unit provided in the shelter; and a first display unit installed inside the shelter for displaying a list of buses scheduled to enter the bus stop,
wherein the first display displays each boarding information of at least one bus selected by a prospective boarding passenger from the list of buses scheduled to enter,
wherein the control unit controls at least one of the plurality of electronic devices based on a number of users in the shelter and a prospective staying time calculated based on the boarding information selected by the prospective passenger,
wherein the control unit transmits the boarding information to each of at least one or more buses selected by the prospective boarding passenger from the bus list, and
wherein the electronic device comprises at least one of a UV sterilizer, an air purifier, an air conditioner, or a lighting.

9. The automatic control system of smart bus platform according to claim 8, wherein the control unit further comprises a second display unit installed outside the shelter and configured to display a bus number information and the boarding information including the number of prospective boarding passenger for each bus of the at least one or more buses selected from the bus list.

10. The automatic control system of smart bus platform according to claim 8, wherein the control unit controls at least one or more of the plurality of electronic devices for each level or variably based on the number of users in the shelter and the prospective staying time.

11. The automatic control system of smart bus platform according to claim 8, wherein the shelter further comprises a thermal imaging camera for detecting the user, and
wherein the control unit obtains the number of users based on the users detected by the thermal imaging camera.

\* \* \* \* \*